U
nited States Patent [19]

Renner

[11] 4,404,559
[45] Sep. 13, 1983

[54] ROTATIVE POWER AND SIGNAL COUPLING

[75] Inventor: G. Frederick Renner, Columbus, Ohio

[73] Assignee: Battelle Memorial Institute, Columbus, Ohio

[21] Appl. No.: 267,206

[22] Filed: May 26, 1981

[51] Int. Cl.³ ............................................. H04B 9/00
[52] U.S. Cl. ............................... 340/870.28; 336/123; 340/870.29; 340/870.31
[58] Field of Search ...................... 340/870.27, 870.31, 340/870.28, 870.29; 336/123

[56] References Cited

U.S. PATENT DOCUMENTS

| | | | |
|---|---|---|---|
| 2,894,231 | 7/1959 | Krasno | 336/123 |
| 3,268,880 | 8/1966 | Miller | 340/870.31 |
| 3,317,873 | 5/1967 | Himmelstein et al. | 336/123 |
| 3,535,618 | 10/1970 | Perrins | 336/123 |
| 4,011,551 | 3/1977 | Adler | 340/870.28 |
| 4,175,230 | 11/1979 | Richards et al. | 340/870.28 |
| 4,223,313 | 9/1980 | Chabrol | 336/123 |
| 4,242,666 | 12/1980 | Reschovsky et al. | 340/870.28 |

Primary Examiner—Glen R. Swann, III
Attorney, Agent, or Firm—Robert B. Watkins; Philip M. Dunson

[57] ABSTRACT

A rotative coupling allows the inductive transmission of power and the transmission of informational signals between a stationary part and a hollow, rotating part. The informational signals are transmitted on a modulated beam of light passing through and along the axis of rotation of the hollow, rotative part. The power is transmitted by induction from a coil on the stationary part to a coil on the rotative part, both coils being positioned within stationary core means and the rotative core means, which combine to establish a continuous flux path around the coils.

5 Claims, 2 Drawing Figures

ROTATIVE POWER AND SIGNAL COUPLING

SUMMARY OF THE INVENTION

This invention relates to a rotative inductive coupling for the transmission of electrical power from a stationary part to a rotating part. More particularly, it relates to a power coupling combined with means for transmitting informational signals between the stationary part and the rotating part.

Briefly and in summary, this invention is a rotative, inductive coupling transferring electrical power and information between a rotating part and a stationary part comprising: (a) a stationary core means mounted on the stationary part; (b) an annular stationary coil mounted on the stationary part and encircling a hollow, rotating core means of magnetic material constructed to rotate in the stationary core for establishing a flux path; (c) an annular, rotative coil mounted on the rotating part, encircling the hollow, rotative core means, (d) means for connecting one of the coils to a source of alternating electrical potential and means for connecting the other coil to a use of electrical potential; and (e) a plurality of optical transceivers means mounted at opposing positions on the axis of the hollow, rotating core means, transmitting and receiving information to and from the stationary and rotating parts on a modulated beam of light passing through and along the axis of the hollow, rotative core means.

In the description which follows, the terms stationary and rotating are relative and are used to describe the relationship among the parts of the apparatus in the circumstances being described. In other instances, the stationary part could be rotating and the rotating part could be stationary relative to each other or to the earth or to other objects.

It has often been necessary in the design and construction of apparatus in the past, to provide a way of transmitting electrical power from a stationary part to a rotating part. One means of accomplishing this has been the use of slip rings. In these devices, a conductor terminal on the rotating part slides on a conductor terminal of the stationary part. While still used in some instances, this technique has disadvantages such as friction, and noise both mechanical and electrical.

The alternative use of rotating transformer-type couplings is well developed as exemplified by U.S. Pat. No. 3,535,618. In this type of coupling, a coil is mounted on a stationary member and another coil is mounted on a rotating member. A magnetic core is associated with each coil and the magnetic flux from one coil is linked to the other coil by passing through an air gap separating the two coils. As the air gap increases in width, the mutual degree of flux linking becomes less which is sometimes a problem.

U.S. Pat. No. 3,317,873 is another example of a rotary transformer in which power is transmitted from a stationary part to a rotating part.

It is also often necessary in the design and construction of apparatus that electrical signals be transmitted from a rotating part to a stationary part. These electrical signals may be used in measurement of certain quantities on the rotating elements or they may be used to control equipment on the rotating parts. For example, the temperature and stress in a rotating element such as the rotor of an electric motor have been measured using systems which transfer informational signals from the rotor apparatus to the stationary recording apparatus. The well known way of accomplishing this is by the use of slip rings, but again, in this situation, the slip rings frequently introduce electrical contact noise, friction and heating problems.

In present state-of-the-art communication systems in which information is transmitted at rates of of 100K to 50 M bits per second, the use of slip rings is not a satisfactory means.

Examples of signal coupling devices between stationary and rotating parts are to be found in U.S. Pat. Nos. 2,894,231 and 3,268,880.

In the field of Robotics, the situation is frequently encountered where it is necessary to transmit power and informational signal through a "joint" where one part is stationary and the other is rotating relative thereto. All of the parameters are critically limited in this situation, and a rotative, conductive coupling with electrical signal transmitting capability is needed which incorporates the maximum electrical power transmission in the smallest possible size package, combined with maximum informational signal transmission capability in the smallest size package. The signal must be transmitted free of distortion and at maximum data rates.

The rotative inductive and optical coupling of this invention combines the desired features of large power transmission capability, large signal communication capability, with compact size and weight.

It is therefore an object of the present invention to couple high current flows with efficiency. It is another object to accomplish this with lightweight and small size apparatus.

It is still another object of this invention to communicate signals at a high rate, clear of noise and interference, between a rotative and a stationary part. It is a further object to accomplish this with lightweight and small size apparatus.

To achieve the efficiency objective in the transmission of power in this invention, a flux path of low reluctance is provided. This is accomplished by the provision of a small gap between one core element or means relative to the other. Another object is to improve the size and weight characteristics of the power transmission portion of the apparatus by providing for a high frequency current.

The foreging and other advantages of the invention will become apparent from the following disclosure in which a preferred embodiment of the invention is described in detail and illustrated in the accompanying drawing. It is contemplated that variations in structural features and arrangement of parts may appear to the person skilled in the art, without departing from the scope or sacrificing any of the advantages of the invention.

DETAILED DESCRIPTION OF THE INVENTION

Figure 1:
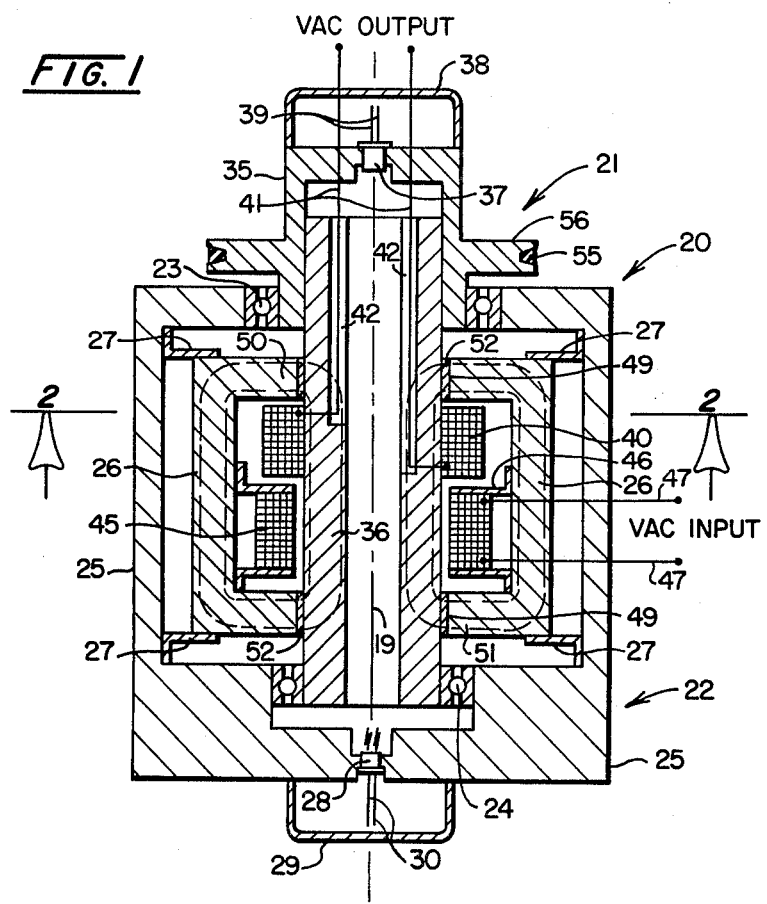
FIG. 1 is an elevational, section view of the electrical coupling of the present invention shown with respect to the rotating and stationary parts.
Figure 2:
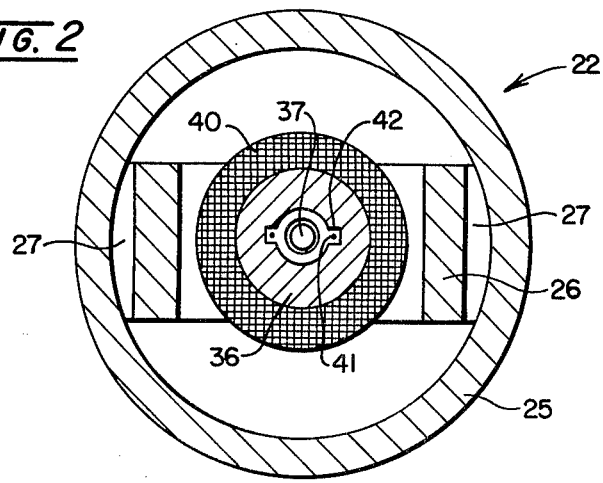
FIG. 2 is a sectional, plan view of the coupling taken on the line 2 of FIG. 1.

Referring to FIGS. 1 and 2, a coupling 20 comprises a rotating part 21 and a stationary part 22. Rotation between parts 21 and 22 is provided by an upper bearing 23 and a lower bearing 24, shown as ball bearings. The parts 21 and 22 are generally circular in cross-section about a longitudinal axis of rotation 19.

The rotating part 21 includes a frame member 35 which supports and surrounds a hollow, rotative core means 36 which also serves as a shaft of rotation for the stationary part 22. An optical transceiver means 37 is mounted in the end of the frame member 35. The end may be enclosed in a cover 38. The transceiver means 37 is provided with one or more signal output leads 39.

An annular, rotative coil 40 is mounted on and in contact with the rotative core means 36. AC voltage power output leads 41 are connected from the rotative coil 40 through an aperture to the inside of the hollow, rotative core means 36 where they may pass through grooves 42 and out through the end of the frame member 35, and the cover 38.

Stationary part 22 includes a main frame 25. The main frame 25 supports an outer stationary core 26 as by bracket means 27 at each end. An optical transceiver means 28 is provided in a housing 29. The optical transceiver means 28 is connected to one or more signal input leads 30.

An annular, stationary coil 45 encircles the rotative core means 36 in close proximity thereto. The stationary core 45 may be supported within the outer core 26 by a bracket means 46. AC voltage power input leads 47 are connected to the ends of coil 45. The hollow, rotative core means 36 passes through a closely separated matching hole in the outer stationary core 26 at an upper end 50 and a lower end 51. Only a very small gap 49 is provided between the core means 26 and 36. A magnetically susceptible lubricant 52 may be interposed in the gap 49.

By way of example, rotative motion may be imparted to part 21 by means of a V-belt 55 running in a groove of a pulley 56 (shown in cross-section). The means of imparting rotation to the rotating part 21 is not an important part of this invention and this may be accomplished by various conventional means.

In the operation and use of this invention, rotative part 21 rotates in and relative to the part 22 by means of the bearings 23 and 24. While rotation takes place, and independently thereof, electrical power in the form of an alternating voltage (a potential) is applied to the coil 45 through the leads 47. This creates an inductive, magnetic field passing through the rotating core means 36 and the outer stationary core 26, generally as indicated by the dashed lines of flux, shown in FIG. 1. The magnetic field induces an alternating current input through the leads 41.

Since the power coupling feature of this invention is in many ways a rotary transformer, many of the design techniques for the increased efficiency of transformers may be applied to this invention. High current flows such as 10 amperes may be coupled with reasonable efficiency. This can be accomplished in a very small size unit with relatively light weight. Because of the manner and configuration of construction, a flux path of low reluctance couples the stationary coil 45 (primary) and the rotative coil 40 (secondary). The gap in the flux path in the construction of the rotative transformer is reduced to an absolute minimum and may be eliminated with the proper selection of a magnetically susceptible lubricant 52.

As a further factor in the reduced size and weight characteristics of the transformer, the frequency of the power signal may be optimized at a much higher rate than the usual 60 Hz in common use. At the higher frequencies, the need for elimination of power losses due to eddy currents may be met by the selection of laminated or powdered ferrite cores which provide low reluctance to magnetic flux. Because of the compactness of the construction of this invention, the inner rotative core means 36 and the outer stationary core 26 may be readily fabricated of powdered ferrites or amorphous silicon steel. These materials may be easily manufactured using powder metallurgy techniques to very close tolerances, and a desirable gap between the ends 50, 51 and the rotating core 36 of 0.001 inches can be maintained with little or no machining.

During rotation of the part 21, signals in the form of a modulated light beam are transmitted and received between the optical transceivers 28 and 37. The transceivers 28 and 37 are positioned so that the center of the beam of light coincides with the axis of rotation 19 of the part 21 in the stationary part 22. This positioning essentially eliminates any need for synchronization between the frequencies or rate of rotation of the rotating part 21 with the frequencies in the signal communication system. The frequency of the information transmission is unlimited. There is no noise or interference in the signal as a result of the mechanics of the rotational aspects of the apparatus.

This is very helpful and a significant improvement in rotative coupling apparatus. In telemetry and robotics where signal frequencies are desirably in the range of $5 \times 10^6$ Hz and information communication rates are desirably in the range of $10 \times 10^5$ bits per sec, this separation of the electronics from interrelation with the mechanics of the system brings about a new freedom of choices.

Prior rotative couplings using some form of mechanical signal connectors, such as slip rings could not be used in signal communications at the above described rates.

The art of transmitting information signals on light beams is well developed and the apparatus and systems necessary to carry out transmission along the centerline of the coupling are well within understanding of those skilled in art.

In a typical use of the invention a rotative part 21 would turn at <3,000 rpm relative to the stationary part 22 driven by belt 55 through pulley 56. A VAC potential of 220 volts at a frequency of 60 Hz is applied at the VAC INPUT.

A stationary coil 45 of N turns is supported in the stationary core 26 which is constructed of pressed powdered ferrite. A gap 49 of 0.001 inch separates the stationary core 26 from the rotative core 36. The gap 49 is filled with a magnetically susceptible lubricant 52. A rotative coil 40 of N turns is wound on the rotative core 36. A VAC potential of 220 volts is available at the VAC OUTPUT.

On the stationary part 22 an optical transceiver 28 in transmitting mode provides signals on a light beam of 0.001 watts modulating at $5 \times 10^6$ Hz to an optical transceiver 37 in receiving mode on the rotating part 21.

It is herein understood that although the present invention has been specifically disclosed with the preferred embodiments and examples, modification and variations of the concepts herein disclosed may be resorted to by those skilled in the art. Such modifications and variations are considered to be within the scope of the invention and the appended claims.

What is claimed is:

1. A rotative coupling for transferring electrical power and information between a rotating part and a stationary part, comprising:
   a. a stationary core means mounted on the stationary part;
   b. an annular, stationary coil mounted on the stationary part, and encircling a hollow, rotative core means of magnetic material constructed to rotate in the stationary core for establishing a flux path;
   c. an annular, rotative coil mounted on the rotating part, encircling the hollow, rotative core means, the stationary core means including a core portion of magnetic material around the outer perimeter of the coils establishing continuous flux paths through the hollow rotative core means;
   d. means for connecting one of the coils to a source of alternating electrical potential and means for connecting the other coil to an electrical load; and
   e. a plurality of optical transceivers mounted at opposing positions on the axis of rotation of the hollow rotative core means, transmitting and receiving information to and from the stationary and rotating parts on a modulated beam of light passing through and along said axis of rotation of the hollow, rotative core means.

2. A rotative, inductive coupling according to claim 1, wherein the rotating part is supported in bearings carried by the stationary part.

3. A rotative, inductive coupling according to claim 1, wherein the magnetic material of the hollow, rotative core means is a compacted powdered ferrite.

4. A rotative, inductive coupling according to claim 1, wherein at least one of the transceivers is mounted on the stationary part and at least one of the transceivers is mounted on the rotating part.

5. A rotative inductive coupling according to claim 1, wherein the magnetic material of the hollow, rotative core means is an amorphous silicon steel.

* * * * *